United States Patent [19]

Hynes

[11] Patent Number: 5,188,397
[45] Date of Patent: Feb. 23, 1993

[54] CLAMP AND CLAMP SUPPORTING APPARATUS

[75] Inventor: Joseph H. Hynes, Houston, Tex.

[73] Assignee: Cooper Industries, Inc., Houston, Tex.

[21] Appl. No.: 621,776

[22] Filed: Dec. 4, 1990

[51] Int. Cl.⁵ .......................................... F16L 17/00
[52] U.S. Cl. ..................................... 285/24; 285/367; 285/419
[58] Field of Search ............... 285/366, 367, 419, 373, 285/24, 5, 23, 82

[56] References Cited

U.S. PATENT DOCUMENTS

| | | | |
|---|---|---|---|
| 2,588,573 | 6/1949 | Risley et al. | 285/367 |
| 2,766,829 | 10/1956 | Watts et al. | 166/75 |
| 3,403,931 | 10/1968 | Crain et al. | 285/334.2 |
| 3,661,409 | 5/1972 | Brown et al. | 285/82 |
| 3,756,629 | 9/1973 | Gibb | 285/367 X |
| 4,984,830 | 1/1991 | Saunders | 285/368 |
| 5,080,400 | 1/1992 | Adamek et al. | 285/367 |

FOREIGN PATENT DOCUMENTS

| | | | |
|---|---|---|---|
| 628258 | 10/1961 | Canada | 285/367 |
| 1194658 | 6/1965 | Fed. Rep. of Germany | 285/367 |
| 492630 | 10/1955 | Italy | 285/367 |
| 840696 | 7/1960 | United Kingdom | 285/367 |

*Primary Examiner*—Eric K. Nicholson
*Attorney, Agent, or Firm*—Jackie L. Duke; Alan R. Thiele; Eddie Scott

[57] ABSTRACT

An improved clamp and clamp supporting apparatus includes a clamp of semicircular arcuate segments with enlarged ear portions having bolt studs positioned thereon in a staggered pattern. Through holes are drilled in the ear portions in a complementary pattern to receive the bolt studs of adjacent clamp segments with nuts threaded thereon to secure the clamps around abutting clamp hubs and maintain the hubs in sealed relationship. One of the clamp hubs has paired guide rods extending therefrom on opposite sides engaging mating holes in the clamp to allow positioning the clamp in a desired position without requiring additional support means.

4 Claims, 5 Drawing Sheets

CLAMP AND CLAMP SUPPORTING APPARATUS

BACKGROUND

This invention concerns a device for supporting a connection apparatus of the type often used in the oilfield industry for connecting tubular members in sealed relationship. These connection apparatuses are referred to as "clamps" and are used in a variety of applications such as connecting valves to outlets of wellhead housings, connecting wellhead housings in series in vertical relationship and connecting large pressure control devices known as blowout preventers in end-to-end relationship. These clamps are preferred over conventional bolted flange connections in many situations as they require a fewer number of bolts to be tightened and are therefor usually quicker to install or remove.

In the larger sizes however, these clamps are heavy and unwieldy and require some additional means for supporting them in a preferred position during installation. Previously, such means have included ad hoc methods as supporting the clamps with a fork truck or using various rigging arrangements with cables or straps supported by whatever hoisting equipment was available. These methods have proven unacceptable as the surrounding structure of the wellhead or blowout preventer interfered with the rigging arrangement or use of the fork truck. Additionally, these installations must often be done in hostile weather environments or underwater which impose even more problems in handling these large connecting structures.

This invention is for an apparatus which supports a clamp on one hub of a clamp type connection to facilitate installation and removal of the clamp. The invention also has a unique configuration for the bolts used to hold the clamp in its clamped position which allows a greater number of smaller bolts to be used on a clamp of conventional configuration. This use of smaller bolts allows lighter, easier to handle wrenching means to be used.

Prior clamp connections include the J. D. Watts et al. U.S. Pat. No. 2,766,829 which discloses a clamp of the type whose installation the present invention is intended to facilitate. A seal ring typically used with this type of connection is also disclosed.

The R. L. Crain et al. U.S. Pat. No. 3,403,931 shows a modification to the clamp of Watts whereby an axially extending shallow groove is cut in the clamp halves to allow flexure of the clamp body to better distribute the stresses developed in the clamp body during installation.

Another form of clamp connection is disclosed by B. Saunders in U.S. patent application Ser. No. 07/458,957 filed Dec. 29, 1989 now U.S. Pat. No. 4,984,830 and assigned to the same assignee as the present application. This clamp connection uses a plurality of collet segments urged into engagement with hubs configured to receive them by a pair of cam rings operated by axially disposed bolting means. No means for holding the segments or cam rings during installation or removal is disclosed.

SUMMARY

The subject invention relates to a novel apparatus for holding a conventional clamp in an initial open position during placement around the hubs to be joined. In its preferred embodiment, one of the hubs to be joined by a clamp has four threaded holes disposed on the hub. A pair of holes are positioned on opposite sides of the hub, with threaded guide rods positioned therein. Mating holes are drilled through the clamp halves which guide and support the clamps from their initial open position to a closed position whereby the clamps initially contact the tapered backfaces of the clamp hubs. Suitable bolting means are disposed on the lugs or ears of the clamp. A tightening of the bolts allows the hubs to be preloaded into a position of abutting sealed engagement. The lugs of the clamp have a plurality of studs disposed thereon in a novel staggered configuration which allows the use of smaller studs albeit a larger number on a clamp of the same nominal size. These smaller studs allow the use of lighter, more easily handled wrenching means. Upon completion of the installation, the guide rods may be removed from the hub if desired. The studs are of sufficient length to allow the nuts to remain on the studs when the clamp is fully open.

An object of the present invention is to provide an apparatus which facilitates the installation and removal of large clamps typically used in the oilfield industry.

Another object of the invention is to provide a supporting apparatus for clamps which requires only minimal modification of existing clamp hub configurations and does not interfere with the normal operation of the clamp.

A further object of the present invention is to provide a novel configuration for the bolting arrangement on a clamp required to maintain the clamp secured on the clamp hubs in order to reduce the size and weight of the wrenching means typically required to install these clamps.

A still further object of the present invention is to provide a clamp hub connection wherein the clamp segments, studs and nuts are retained on one hub to eliminate any loose pieces.

BRIEF DESCRIPTION OF THE DRAWINGS

These and other objects and advantages of the present invention are set forth below and further made clear by reference to the drawings wherein.

DESCRIPTION OF THE PREFERRED EMBODIMENT

Figure 1:
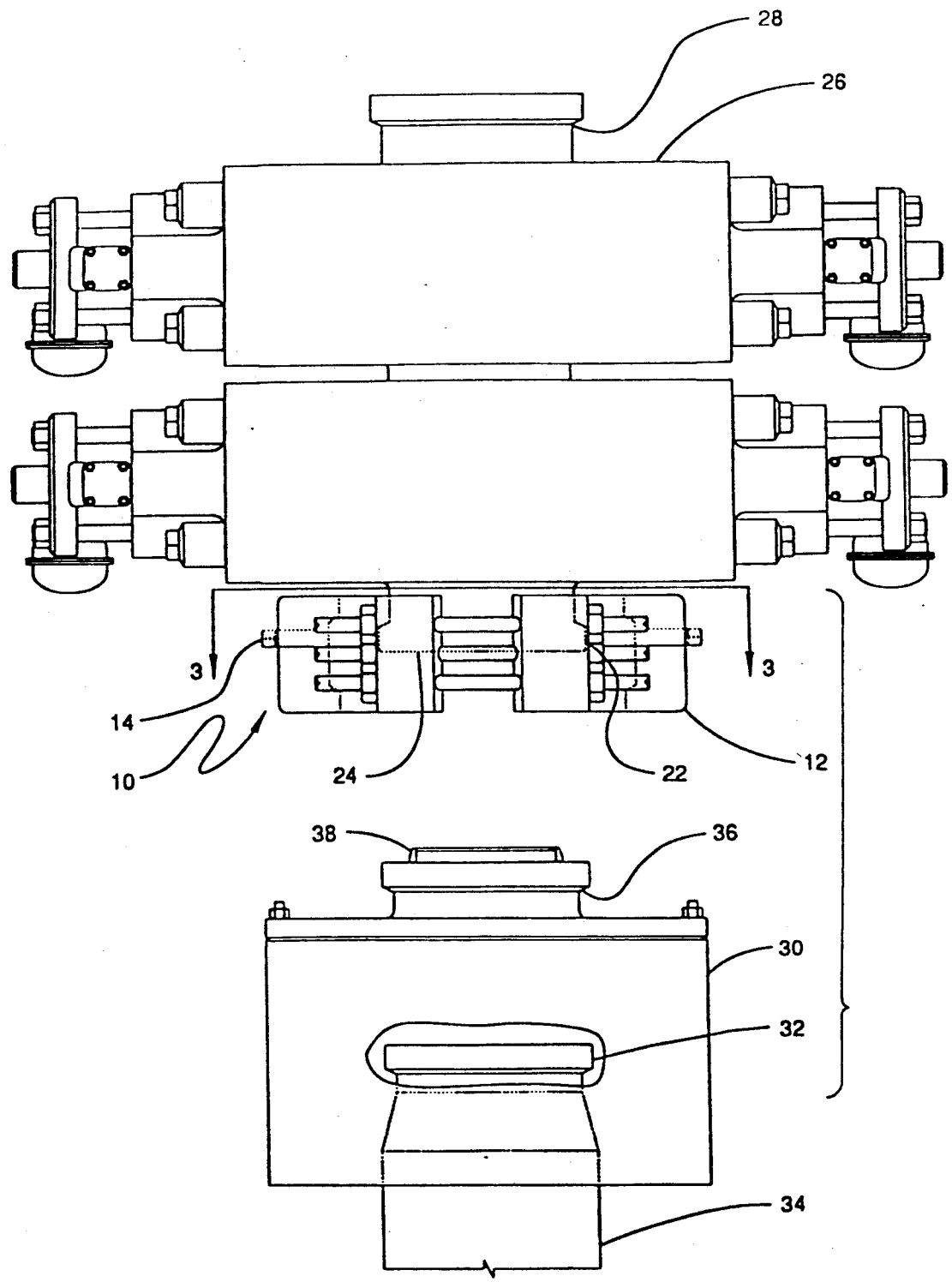
FIG. 1 is an elevation view, partly in section, of the clamp supporting apparatus supporting the clamp on the lower clamp hub of a blowout preventer which is suspended over a mating clamp hub on a wellhead connector.
Figure 3:
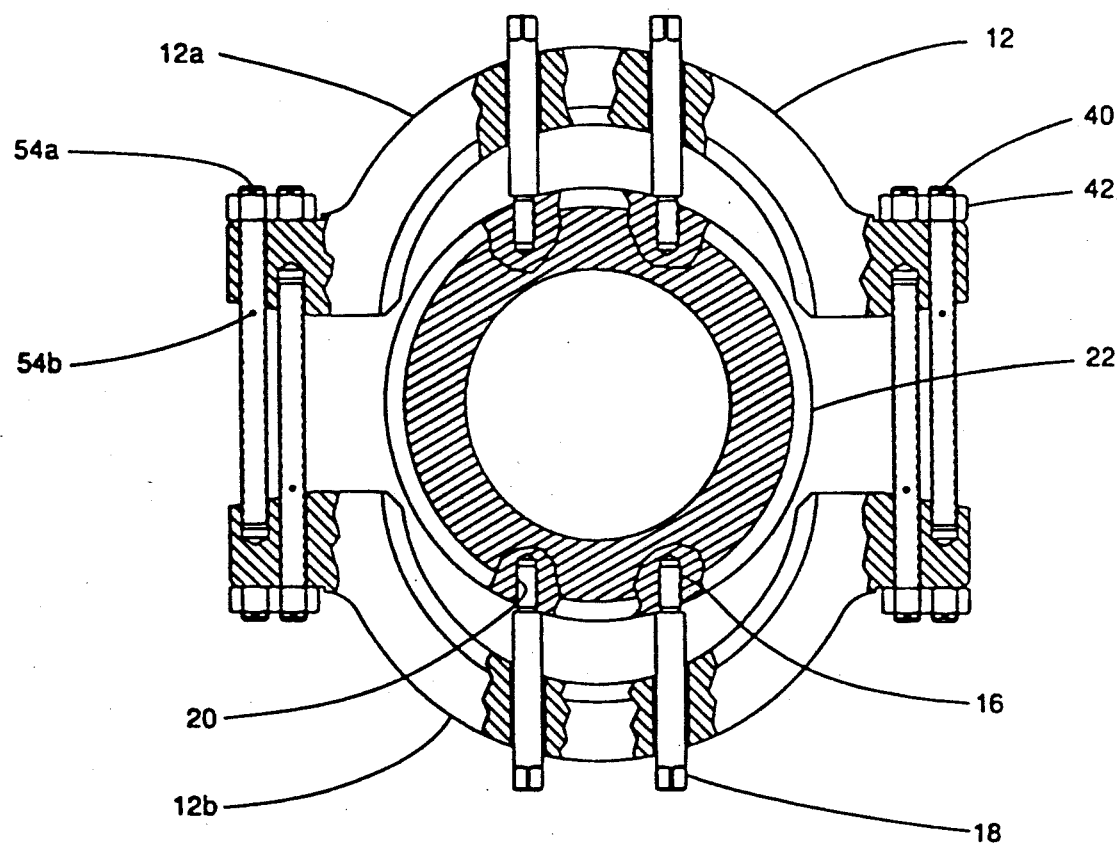
FIG. 3 is a sectional view taken along lines 3—3 of FIG. 1 of the clamp supporting apparatus and clamp in the fully open position.
Figure 4:
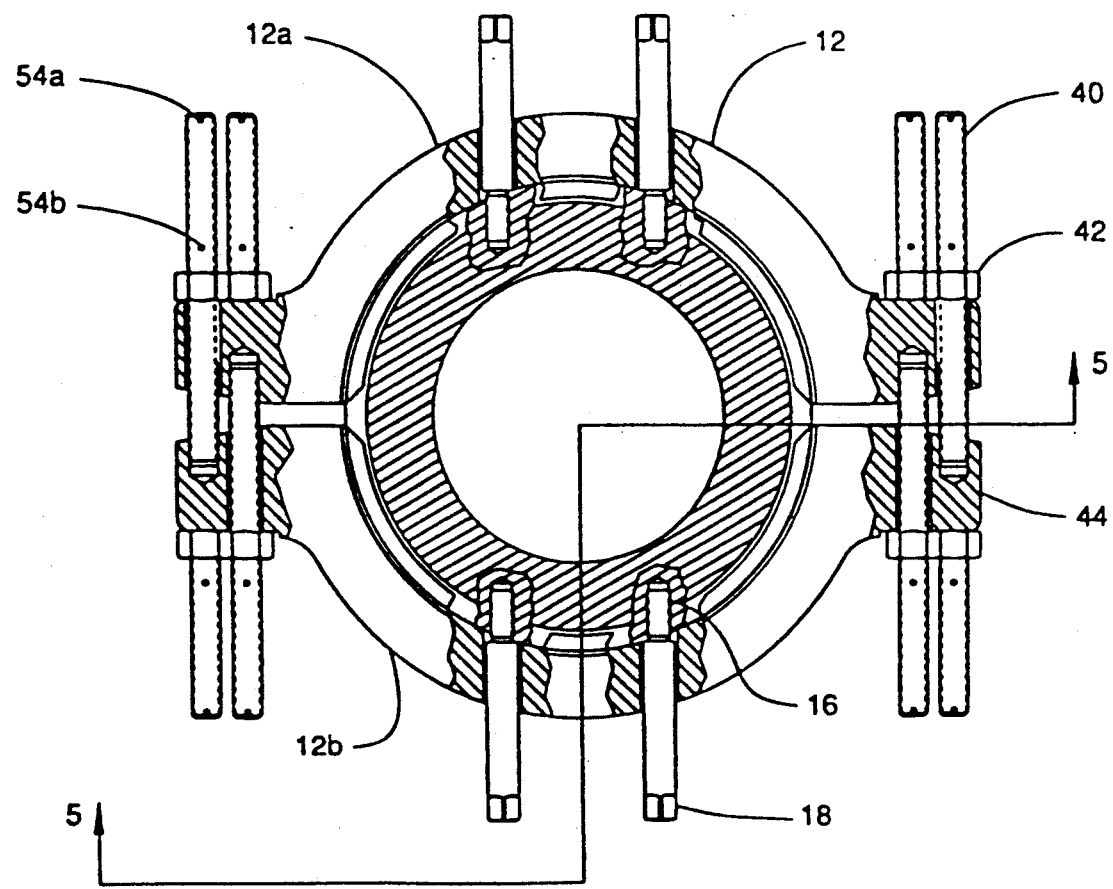
FIG. 4 is a sectional view taken along lines 4—4 of FIG. 2 of the clamp supporting apparatus and clamp in the fully closed position.

With reference to FIG. 1, the improved clamp and supporting apparatus is denoted generally by numeral 10 and is composed of clamp assembly 12 and guide rods 14. Guide rods 14 have external thread 16 formed at their inner end and wrenching flats 18 at their outer end as seen in FIGS. 3 and 4. Guide rods 14 are disposed horizontally in tapped holes 20 in the enlarged portion 22 of clamp hub 24 to support clamp assembly 12 in its open position Clamp hub 24 is disposed on the lower end of blowout preventer 26 with a similarly shaped clamp hub 28 on the upper end thereof. Wellhead connector 30 sealingly engages hub 32 of wellhead housing 34 in a manner well known to those skilled in the art. Clamp hub 36 is disposed on the upper portion of wellhead connector 30 and is of the same size as clamp hub 24 for engagement therewith. Seal ring 38 is placed within clamp hub 36 before hub 24 is lowered into position thereon.

Clamp assembly 12 is composed of arcuate clamp halves 12a and 12b and suitable bolting means as studs 40 and nuts 42. Clamp halves 12a and 12b are semicircular in plan view as best seen in FIGS. 3 and 4 with bolting ears or lugs 44 disposed at each end. Clamp halves 12a and 12b are mirror images of one another differing only in the arrangement bolt studs 40 on bolting lugs 44.

Figure 5:
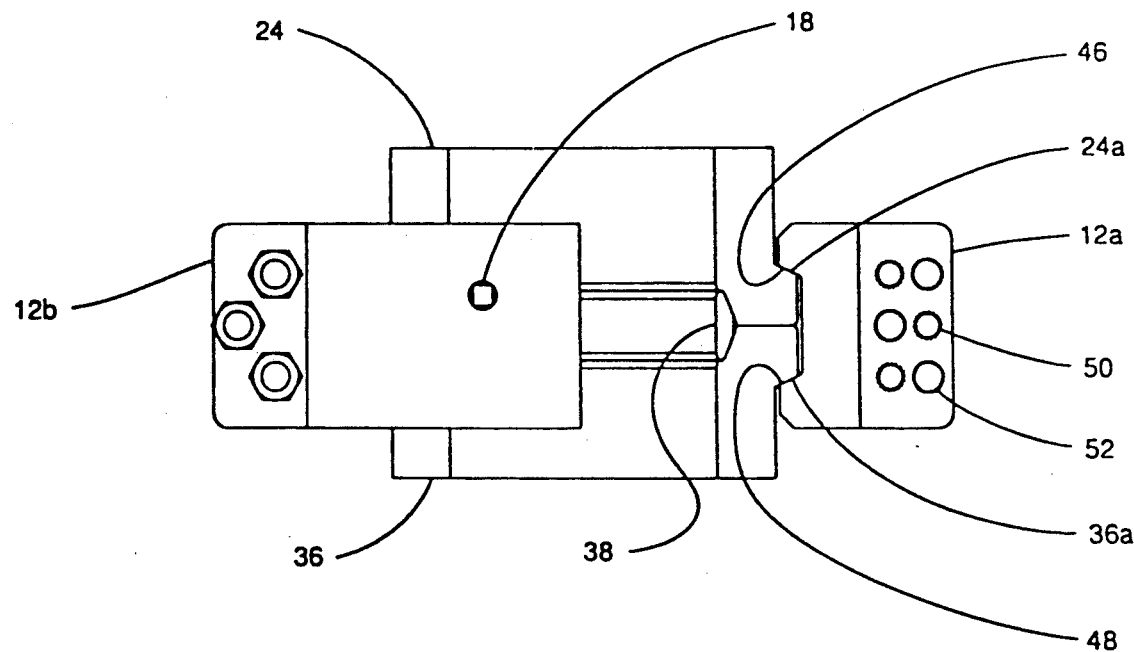
FIG. 5 is a sectional view taken along lines 5—5 of FIG. 4 showing details of the bolt stud arrangement on the bolting lugs.

As best seen in FIG. 5, clamp halves 12a and 12b have tapered internal profiles 46 and 48, respectively, which engage complementary profiles 24a and 36a of hubs 24 and 36. When nuts 42 are tightened on studs 40 to the position shown in FIG. 4 the sealed connection shown is established. Seal ring 38 is held in position by the engagement of clamp hubs 24 and 36 in a manner well known to those skilled in the art.

Studs 40 are arranged in a staggered pattern as best seen in FIG. 5. Each bolting lug 44 has three studs 40 engaged in drilled and tapped holes 50 and three drilled through holes 52 as shown with the pattern in clamp half 12a being a mirror image of the pattern of clamp half 12b. The drilled holes 52 on a given bolting lug 44 of a clamp half as 12a receives the studs 40 of its mating clamp half 12b. This staggered arrangement of holes 52 and studs 40 allows a closer spacing of the bolting means, thereby allowing a larger number of smaller studs for a clamp of a given size. Each stud 40 has cross drilled holes 54a and 54b therein for purposes to be explained hereinafter.

A typical sequence of operations for use of the improved clamp and supporting apparatus 10 would be as follows. Guide rods 14 are installed in hub 22 as seen in FIG. 1 with clamp assembly 12 supported thereon. FIG. 3 shows this assembly in plan view with clamp halves 12a and 12b in the fully open position to allow clearance for installation over mating hub 36. A cotter pin 56 or piece of welding rod (not shown) may be inserted in holes 54a and 54b to ensure nuts 42 are not removed from studs 40 and clamp halves 12a and 12b cannot be prematurely moved to a closed position. As previously noted, seal ring 38 is placed within the bore of mating hub 36.

Figure 2:
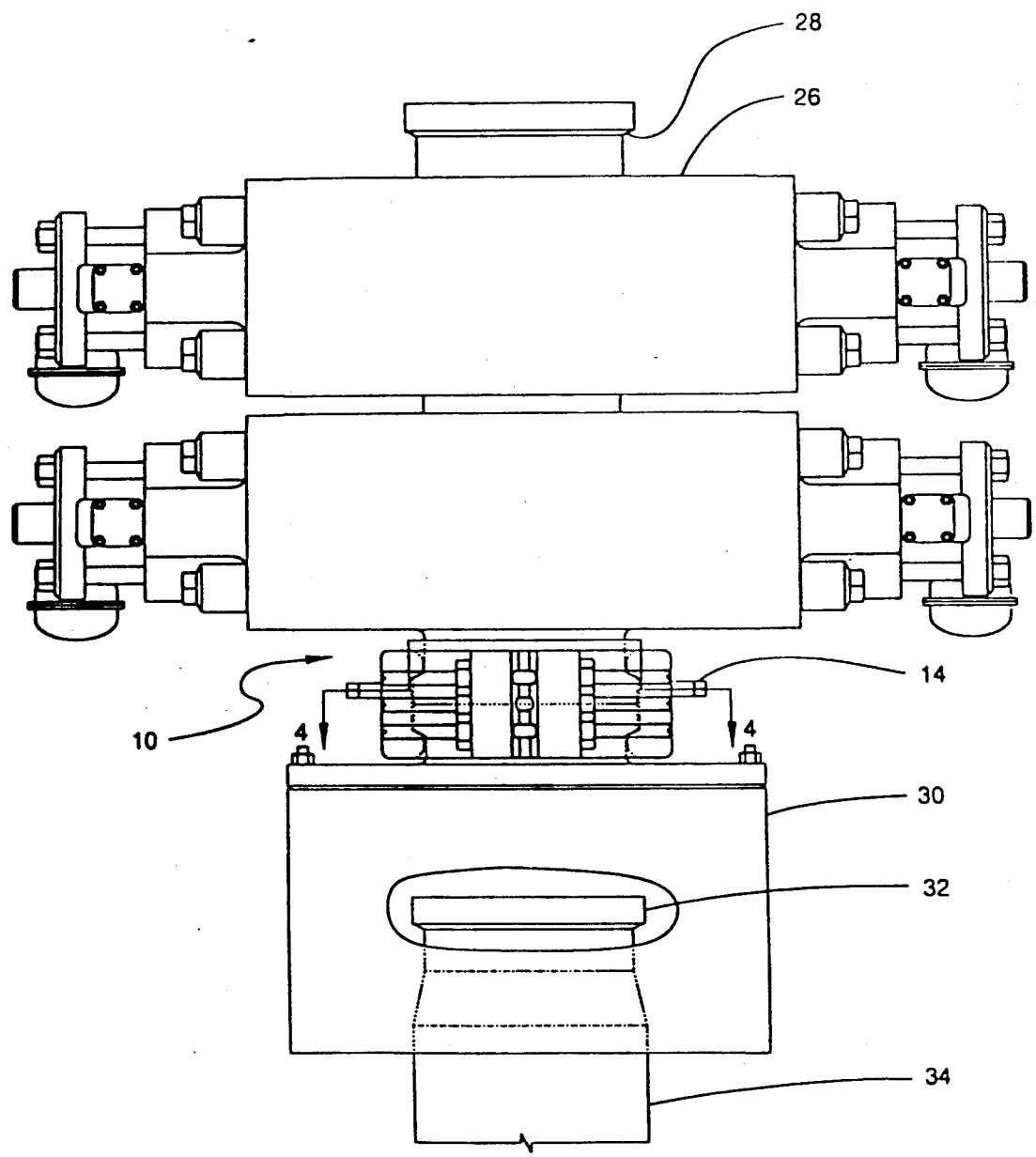
FIG. 2 is an elevation view of the clamp supporting apparatus with the blowout preventer hub connected to the wellhead connector hub by the clamp.

Blowout preventer 26 is lowered into position atop wellhead connector 30 with hubs 22 and 36 in face to face contact. Cotter pins 56 are removed from holes 54b thereby allowing clamps halves 12a and 12b to be manually positioned on guide rods 14 with internal profiles 46 and 48 contacting complementary profiles 24a and 36a of hubs 24 and 36. Nuts 42 can then be tightened on studs 40 to the position shown in FIGS. 2 and 4 by suitable wrenching means, not shown. If desired, guide rods 14 can be removed using wrenching flats 18. When removal of clamp assembly 12 is required, guide rods 14 can be reinstalled in tapped holes 20 of hub 22. Nuts 42 can then be loosened and unscrewed to a position adjacent holes 54a. Clamp halves 12a and 12b are then manually guided on guide rods 14 to a position as shown in FIG. 3 and cotter pins 56 placed in holes 54b to maintain the clamp halves in the full open position while the blowout preventer 26 is lifted from wellhead connector 30. Reassembly is then accomplished as previously described.

If an operator desires to use the improved clamp support apparatus with a clamp of conventional configuration, i.e., without the improved staggered bolting means configuration, the following steps are required. The hub that is to support the clamp during installation must have holes drilled and tapped therein in the parallel configuration as shown in FIG. 3 and 4. Guide rods can then be installed therein as on the preferred embodiment. The clamp halves to be installed can be drilled with holes in a parallel configuration through the clamp body complementary to the placement of the guide rods in the hub. The clamp halves can then be supported on the guide rods for installation in the manner described for the preferred embodiment.

It should be noted the scope of the invention is not limited to the hubs and clamps lying in a horizontal plane as described for the preferred embodiment. The scope of the invention encompasses embodiments in which the hubs and clamps lie in a vertical plane as well as a horizontal plane or any position therebetween. Additionally, the scope of the invention includes embodiments in which there are more than two arcuate segments to the clamp body.

What is claimed is:

1. A clamping apparatus of the type used in the oilfield industry in which abutting tubular member having enlarged end portions with tapered backfaces, are held in sealing engagement by clamp halves with a complementary internal profile which engages said backfaces, comprising:
    a pair of clamp halves with a lug at each end,
    a bolting means disposed on each lug cooperating with a lug of said opposite clamp half to secure said end portions in abutting sealed relationship,
    a support means for maintaining said clamp halves in a planar position when said clamp halves are disengaged from said enlarged end portions, and
    a sealing means disposed between said hubs,
    wherein said bolting means includes:
        a plurality of threaded studs engaging threaded holes in said lugs,
        said studs disposed in staggered relationship on said lugs to minimize spacing between adjacent studs,
        said lugs having mating holes in complementary staggered relationship to the studs of a mating lug,
        said mating holes receiving said studs when said clamp halves are in clamping engagement with said enlarged end portions, and
        said clamp halves are retained in clamping engagement by threaded nuts engaging said studs.

2. A clamping apparatus according to claim 1, wherein:
    said studs are of sufficient length to permit said clamp halves to be opened to a position allowing their installation over said enlarged portion while said studs are in engagement with said lugs, and
    said studs have means thereon for holding said clamp halves in their open position.

3. A clamping apparatus according to claim 2, wherein said support means includes:

a plurality of guide rods extending transversely from either of said first and second tubular members, said guide rods guide said clamp halves from their open to their clamped position, and said rods are of sufficient length to support said clamp halves in said planar open position prior to installation.

4. A clamping apparatus according to claim 3, wherein:

said guide rods extend through said clamp halves and threadedly engage said enlarged portion of said tubular members, and said guide rods are removable from said enlarged portions when said clamping halves are in clamping engagement with said enlarged portions.

* * * * *